United States Patent [19]
Costas

[11] Patent Number: 5,873,692
[45] Date of Patent: Feb. 23, 1999

[54] CD PICKER

[76] Inventor: Dan N. Costas, 2503 Vineyard Ave., Pleasanton, Calif. 94566

[21] Appl. No.: 749,424

[22] Filed: Nov. 15, 1996

[51] Int. Cl.$^6$ .................................................. B25J 15/10
[52] U.S. Cl. .......................... 414/796.9; 414/910; 294/97
[58] Field of Search ................................ 294/97, 16, 94; 414/796.9, 796.5, 910, 911

[56] References Cited

U.S. PATENT DOCUMENTS

| | | | |
|---|---|---|---|
| 4,132,443 | 1/1979 | Timberlake et al. | 294/97 |
| 4,857,160 | 8/1989 | Landau et al. | 204/192.12 |
| 5,000,651 | 3/1991 | Akagawa et al. | 414/741 |
| 5,165,340 | 11/1992 | Karlyn et al. | 101/126 |
| 5,195,794 | 3/1993 | Hummel, Jr. et al. | 294/94 |
| 5,503,446 | 4/1996 | De Jong | 294/94 |
| 5,669,652 | 9/1997 | Reising et al. | 294/97 |
| 5,692,878 | 12/1997 | Freund | 414/796.9 |
| 5,713,618 | 2/1998 | Kocsis | 294/93 |

*Primary Examiner*—Karen M. Young
*Assistant Examiner*—Gregory A. Morse
*Attorney, Agent, or Firm*—Limbach & Limbach L.L.P.

[57] ABSTRACT

An apparatus and method for picking up a single compact disc from a stack of compact discs wherein each disc has a hub. A plurality of members are inserted into a center bore of the disc stack, which is defined by the hubs of the discs. The top disc in the stack is separated from the stack when a sufficient number of members are in contact with the hub of the disc and a radial force is exerted on the hub.

16 Claims, 7 Drawing Sheets

CD PICKER

BACKGROUND

This invention relates to a method and apparatus for repetitive handling of compact discs, and more particularly, to an apparatus suitable for picking a single compact disc from a stack of compact discs.

Existing equipment for picking a single compact disc is unnecessarily complex and expensive, and it remains desirable to find a low-cost, simple solution to this problem.

SUMMARY OF THE INVENTION

The present invention is a method and apparatus for picking a single compact disc from a stack of compact discs. The compact discs are aligned in the stack such that the center holes of the discs define a central cylindrical area. A picker module includes at least two arms vertically disposed in opposition to each other and positioned for insertion into the central cylindrical area. A vertical positioning device is provided for moving the picker module in a vertical manner into and out of the cylindrical area. When the picker module is inserted into the cylindrical area, the arms are caused to move away from each other thereby engaging the hub of the top disc in the stack. The disc may then be lifted by the picker module and placed somewhere else, for example, in a compact disc recording unit, by causing the arms to move toward each other.

In a particularly preferred arrangement, at least one arm is tapered inwardly toward the other arms.

In a preferred embodiment of the invention, a base module is provided which includes at least one and preferably four compact disc recording units mounted in the base such that the door opens by extending outwardly from the front face of the base module. The compact disc recording units are arranged in a horizontal line across the front face of the base module, as is a disc hopper containing the stack of discs. An indexing rail provides horizontal position marks in correspondence with the disc hopper and the compact disc recording units. Means are provided for detecting the horizontal position marks.

A controller is provided for moving the picker module relative to the base module, for example, between the disc hopper and the compact disc recording units. Such movement is controlled by using the horizontal position marks.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE INVENTION

The present invention provides a picker assembly suitable for picking a single compact disc from a stack of compact discs, as will now be described.

Figure 1:
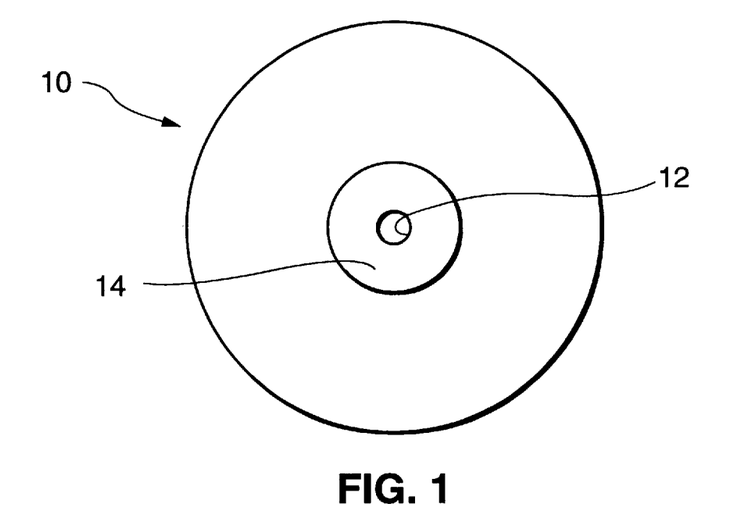
FIG. 1 is a top plan view of a compact disc.

As is known, a compact disc is a circular plastic substrate having digital information, such as audio or data information, encoded onto one surface of the substrate by optical or magneto-optical means. Such a disc is illustrated in FIG. 1. The disc 10 is nominally 5.25 inches in diameter and includes a center hole 12 defined by a radial hub 14. The center hole 12 is nominally 0.6 inches in diameter about the center axis. The hub 14 extends orthogonally from the surface of the disc approximately 0.010 inches in order to prevent stacked discs from resting on the recording surface of the disc. A typical stacking density is approximately eighteen discs per inch.

Figure 2:
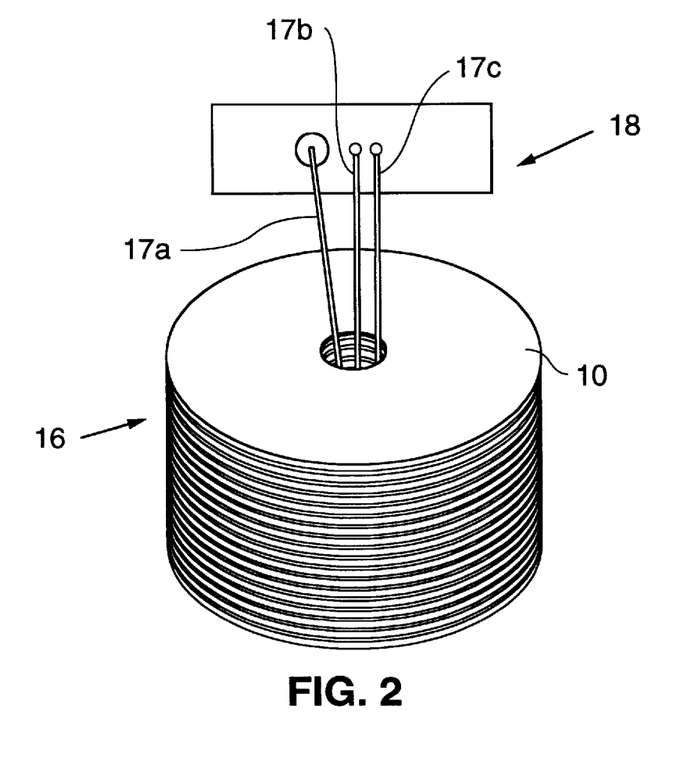
FIG. 2 is a perspective view of a stack of compact discs adjacent a disc picker assembly.

The present invention takes advantage of the simple geometry of the compact disc 10, as shown in FIG. 2, by arranging a plurality of discs 10 into a vertical stack 16, then inserting a picker assembly 18 into the center holes of the stack. As noted above, each of the discs 10 in stack 16 is slightly separated from adjacent discs by respective hubs.

The picker assembly 18 preferably includes three opposing members 17a, 17b and 17c, which are vertically oriented and spaced apart from each other. At least one of the arms 17a is biased inwardly toward the other two arms 17b and 17c, and means are provided for moving the one arm 17a outwardly against the bias, as will be described in more detail below.

The spacing and orientation of the members 17a, 17b and 17c are such that a tapered triangular section is formed. A substantially equilateral triangle is formed when the one arm 17a is moved outwardly against the bias and all arms are in contact with the hub 14 of disc 10.

In a particularly preferred embodiment, the two arms 17b and 17c are rigidly held in a vertical orientation to contact two points on the hub, and the one arm 17a is angled or tapered inwardly toward the other arms with a taper of approximately 0.010 inch for each inch of vertical height.

Figure 3A:
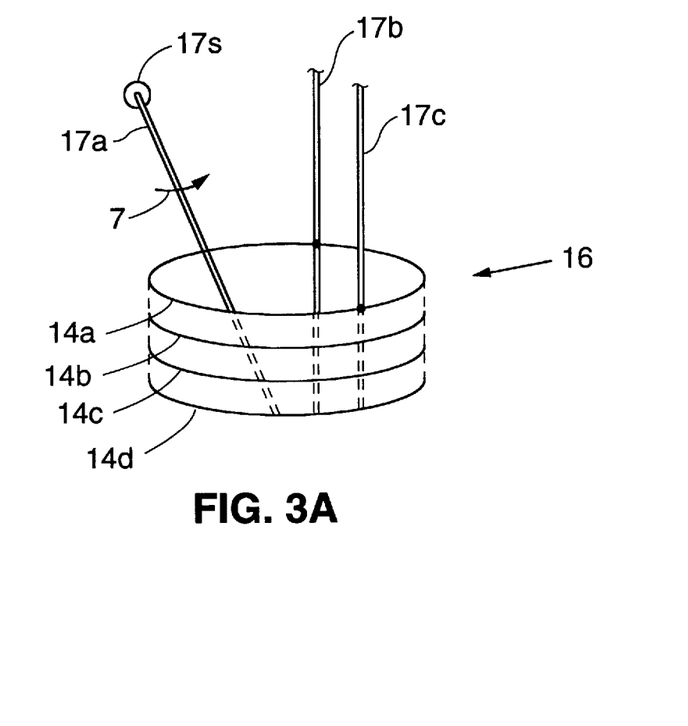
FIG. 3a is a perspective view showing the interaction between the disc picker assembly and the stack of compact discs when the picker assembly is first inserted into the stack.

Thus, as shown in FIG. 3a, when the picker assembly 18 is first inserted into the cylindrical area defined by the center holes 12 in the stack 16, the members 17b and 17c contact the edge of hub 14a. The member 17a is not initially in contact with the edge of hub 14a due to the bias applied to the member 17a, as represented by arrow 7. Upon moving the member 17a against the bias, as represented by arrow 8 in FIG. 3b, the member 17a contacts the edge of hub 14a, i.e., the top disc in stack 16, but not any of the discs below the top disc, as represented by hubs 14b, 14c and 14d, due to the angled taper of the member 17a. The force exerted by the arms on the hub need not be significant since the discs are quite light.

Figure 3B:
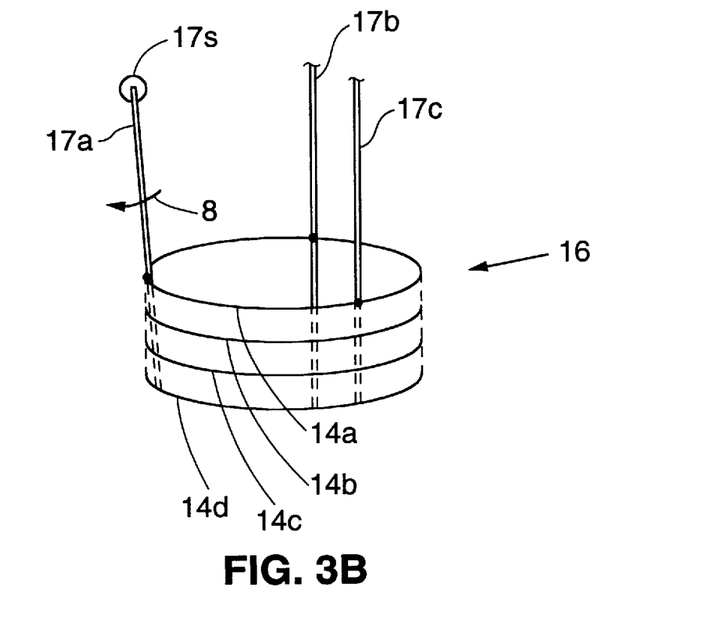
FIG. 3b is a perspective view showing the interaction between the disc picker assembly and the stack of compact discs when all members are contacting the hub.

The members 17a, 17b and 17c are preferably adapted for a nominal amount of resilient deformation, such that by contacting the hub 14a, the edge of hub 14a is held by the outwardly applied force. For example, non-deformable stainless steel tubular rod is well suited for this application. In the preferred embodiment, member 17a is made from 3/16 inch stainless steel rod, and members 17b and 17c are made from 1/8 inch stainless steel rod.

The picker assembly can then be raised out of the way of the stack 16 and moved to another position where the disc may be deposited or removed.

In a preferred construction, two of the members 17b and 17c are rigidly fixed in position, and the one flexible biased member 17a is coupled for rotation about shaft 17s. The picker assembly is lowered to insert the opposing members into the cylindrical area defined by center holes 12. Then the one member 17a is rotated about shaft 17s to positively engage the hub 14a. The picker assembly is then raised and moved to another position, where the one member 17a is rotated in the opposite direction on shaft 17s to disengage the hub 14a, thereby releasing the disc to allow it to fall into a disc hopper, or a compact disc recording unit, as described in more detail below.

The opposing members could have a number of different geometries, as will be apparent with one having skill in this area. For example, two members may directly oppose each other with at least one having a tapered relationship within the center hole region. It is also conceivable that a conical section, such as a deformable bladder, could be used. However, I have found that a simple and efficient electromechanical apparatus can be constructed using three opposing members to contact the hub at three points, as described above.

While it is preferable that at least one of the opposing members be tapered, it is conceivable that all of the members could be completely vertical. In that case, the members must be capable of slight deformation when contacting the hub such that only one disc is picked. Otherwise, if the members are strictly vertical then more than one disc will in all likelihood be picked from the stack.

It is also conceivable that a suitable geometry could be provided to have the picker arms grab the outside edge of the disc rather than engaging the hub. Thus, two arms could be vertically oriented to contact the outside edge of the disc at two points, and the third arm could be angled or tapered with an extreme outward bias, then operated to move inwardly sufficiently to contact the edge of the disc, but maintaining an angle relative to the vertical to avoid contacting any but the top disc in the stack.

It is also conceivable that the principles disclosed herein could apply to any stack of flat substrates having uniform dimensions, regardless of shape.

Figure 4:
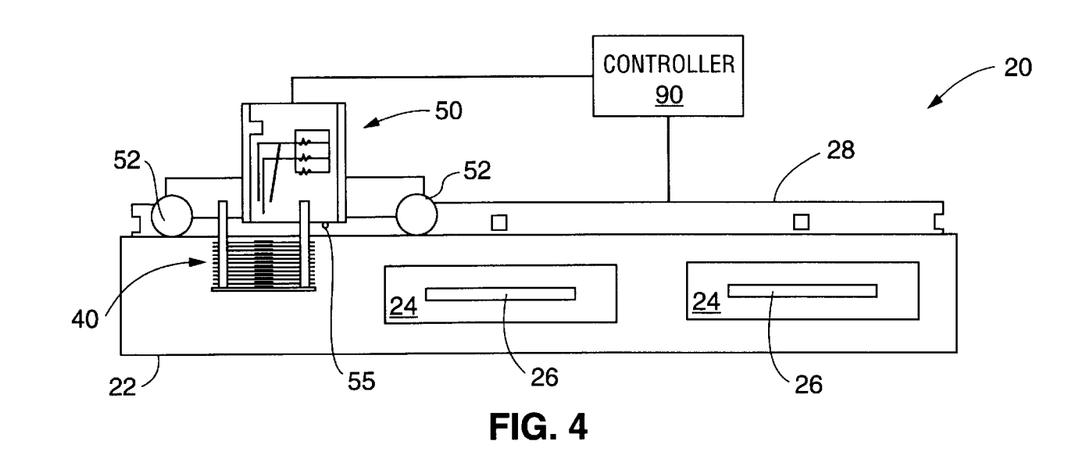
FIG. 4 is a front elevational view of a modular disc handling unit constructed in accord with the present invention.

Referring now to FIG. 4, a modular disk handling unit 20 utilizing the principles of the present invention is illustrated. The disk handling unit 20 includes a base module 22 having two compact disc recording ("CDR") units 24 mounted therein. In the preferred construction, base modules having four CDR units arranged in a line are provided, although the number of units included in a module is rather arbitrary and may be dictated more by physical or practical considerations. Such modules are suitable for interconnection to provide even longer lines of CDR units. These modules are useful, for example, to provide a simple electromechanically controlled means for mass recording of information content onto conventional compact discs.

Figure 5:
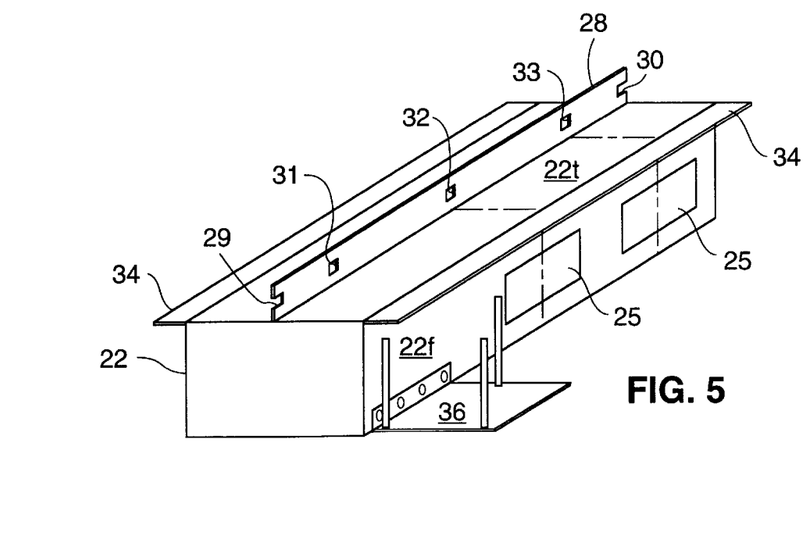
FIG. 5 is a perspective view of the base portion of the disc handling unit.

As seen more clearly in FIG. 5, the base 22 is preferably made from standard sheet metal which is formed to provide a support structure having two primary working surfaces, namely the front face 22f and the top face 22t. The CDR units 24 are mounted within openings 25 in the front face 22f of the base 22, for example with conventional mounting hardware, such that the doors 26 of CDR units 24 open outwardly from the front face of the base. The interior volume of the base 22 is utilized only to contain the CDR units 24 and related wiring connections, although it is certainly conceivable that the base could be modified to include an integrated controller.

The base 22 includes an index rail 28 which is affixed to the top face of the base, for example by weldment. The index rail 28 includes end cutouts 29, 30 on respective ends thereof, as well as position cutouts 31, 32, 33 along the rail. The position cutout 31 is located on the rail 28 in a position which allows picker assembly 50 to be centered with respect to the center line of CD's stored in the disc hopper 40. The position cutouts 32, 33 are located to correspond with the CD center line of CDR units 24.

Additional modules may be interconnected together, and additional cutouts will therefore be provided which correspond to additional positions. A tab or some other covering means will then be used to cover end cutout 30 (and end cutout 29' on the next module) so that the beginning and end of the index rail will be properly defined.

The base also includes a pair of tracks 34 which are affixed to the top face 22t of the base at the front and back edges thereof, for example by weldment. A disc picker assembly 50 is mounted on wheels 52 and adapted for movement across the top face 22f on tracks 34 in response to programmed control provided by a controller 90, as will be described in more detail below.

Figure 6:
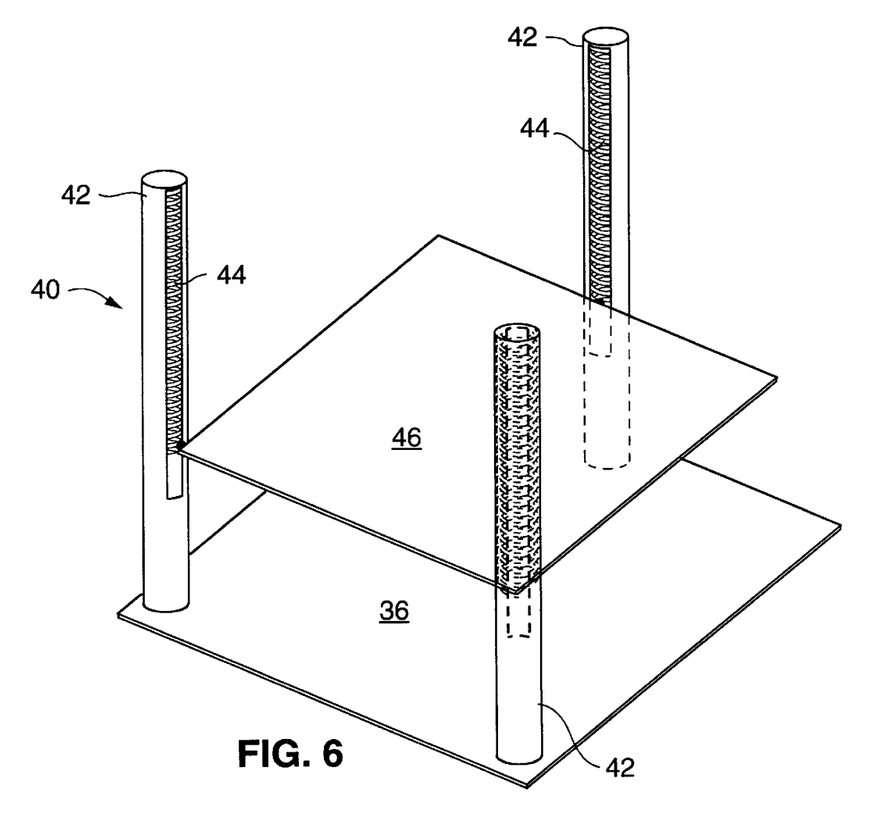
FIG. 6 is a perspective view of the disc hopper portion of the disc handling unit.
Figure 7:
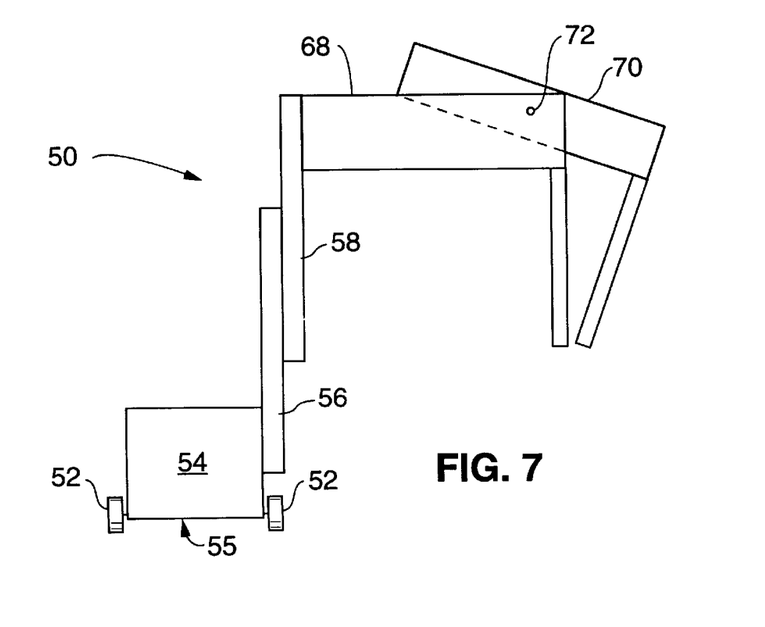
FIG. 7 is a side elevational view of the picker assembly portion of the disc handling unit.
Figure 8:
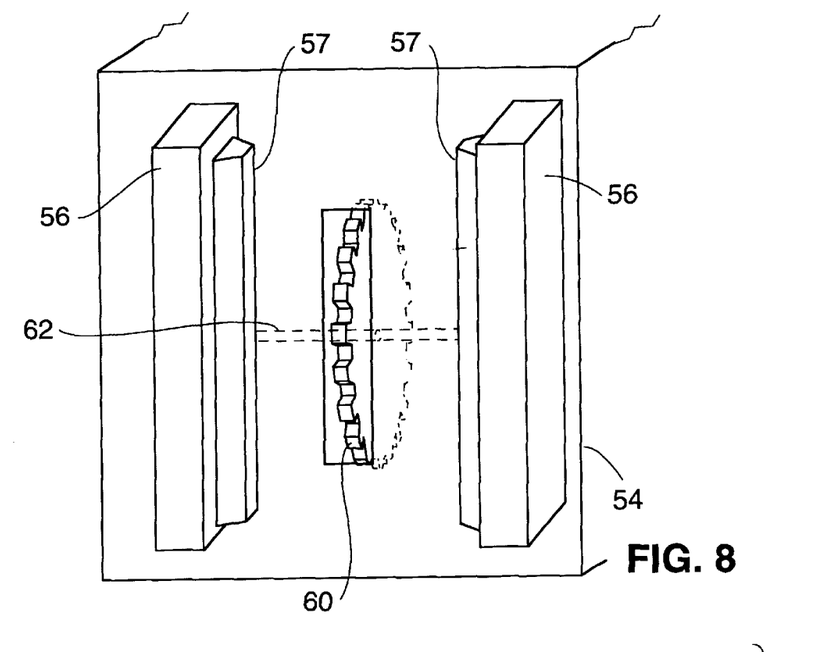
FIG. 8 is a front elevational view of a portion of the picker assembly.
Figure 9:
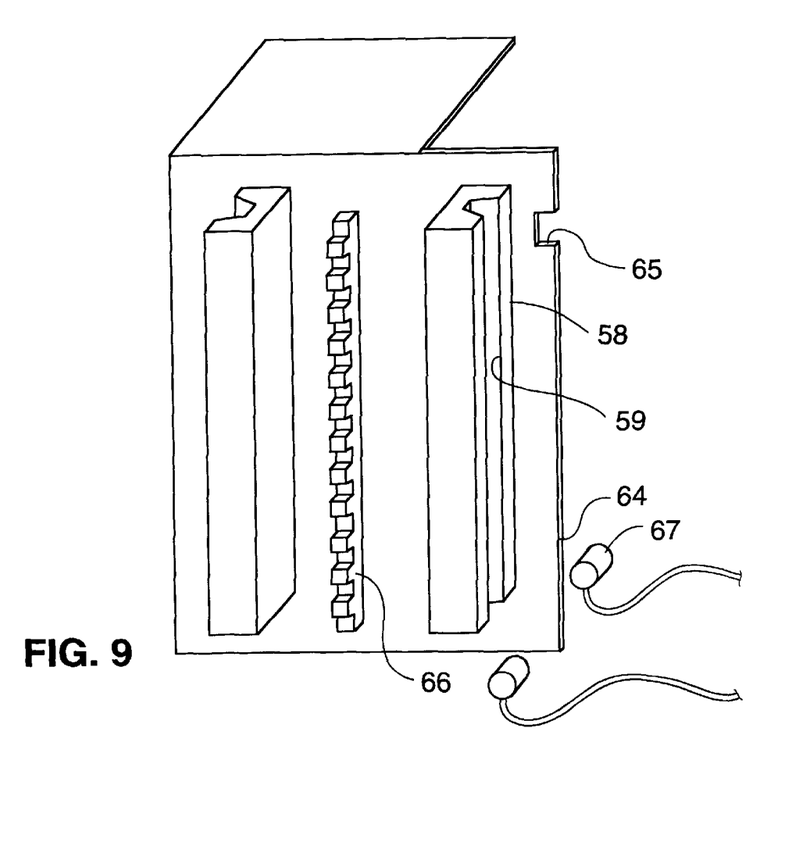
FIG. 9 is a rear elevational view of a portion of the picker assembly which mates with the portion shown in FIG. 8.
Figure 10:
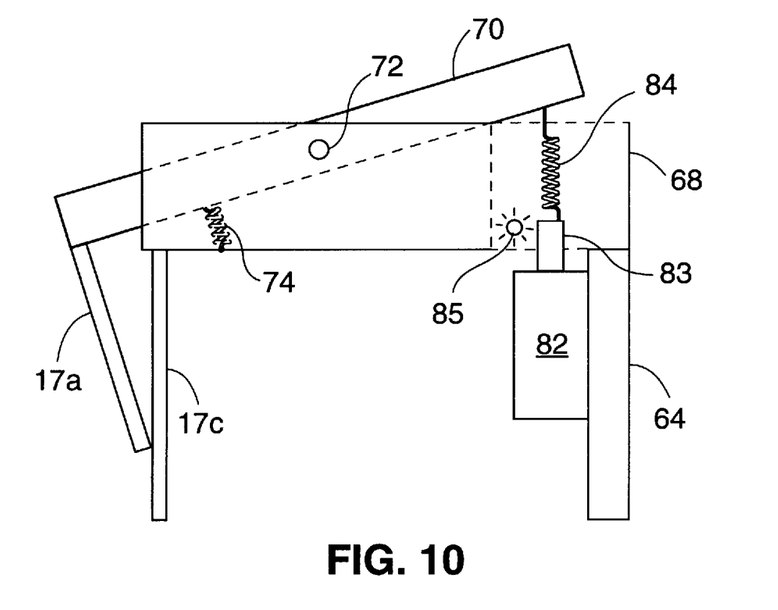
FIG. 10 is a side elevational view of a portion of the picker assembly.
Figure 11:
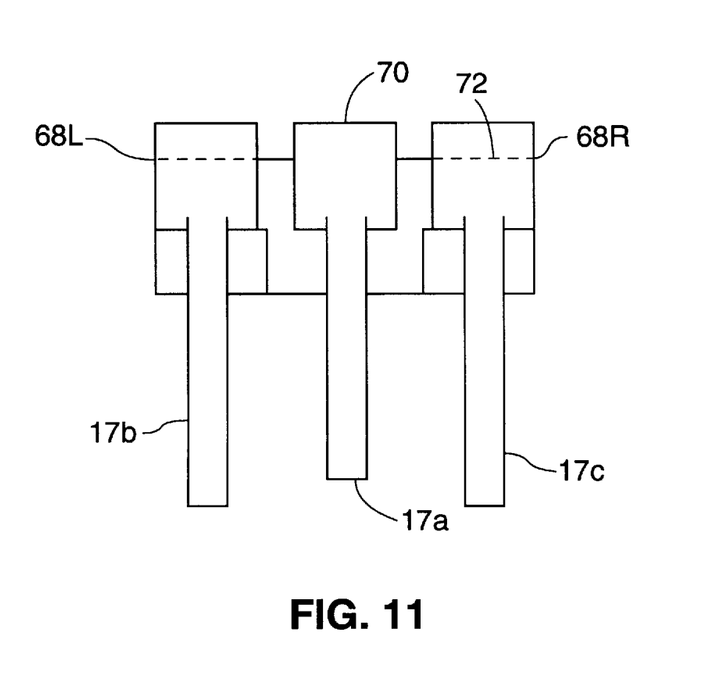
FIG. 11 is a front elevational view of a portion of the picker assembly.

The base further includes a hopper support plate 36 extending from the bottom of the front face 22f for supporting the disc hopper 40, as will now be described with reference to FIG. 6.

Disc hopper 40 preferably includes three vertical posts 42 which are affixed to the hopper support plate 36, for example, by nut and bolt. Each of the posts 42 is a hollow steel cylinder containing a spring 44 axially disposed therein and having one end affixed to the top of the post and the other end affixed to a disc support plate 46. The springs 44 impart an upward bias to the disc support plate 46, and the weight of a stack of CD's loaded into the hopper 40 pushes the disc support plate 46 downward.

The vertical size of the disc hopper 40 is relatively arbitrary. The stacking density for CDR's is approximately eighteen per inch, therefore, a hopper providing a suitable number of discs may be easily constructed utilizing the principles described herein.

The picker assembly 50 is utilized to pick a single CD from the hopper 40 and deliver the CD to a CDR unit 24, as will now be described with reference to FIGS. 7–10.

The picker assembly 50 includes a motor housing 54 mounted for travel on wheels 52 across the top face 22t of the base 22. A photoeye 55 is affixed to the bottom of motor housing 54 in a position to interrogate the index rail 28 at the height of cutouts 29–33. The photoeye 55 thus provides control signals to controller 90 regarding the position of the motor housing 54 relative to the base 22.

A first set of rails 56 is rigidly affixed to the front of the motor housing 54. A second set of rails 58 is coupled for indexed movement relative to the first rail 56. For example, in the preferred embodiment, the first set of rails 56 is spaced apart from each other and fixed to the motor housing. Each rail 56 has a ridge 57 vertically disposed on the inside of the rail such that the ridges 57 face each other. A toothed gear 60 is mounted on a shaft 62 and coupled to a drive motor 62 mounted within the motor housing 54, such that the gear 60 extends between the rails 56.

The second set of rails 58 is spaced apart from each other and fixed on a plate 64 along with a toothed cog 66. Each rail 58 includes a groove 59 vertically disposed on the outside of the rail and adapted to mate in a sliding fashion with the corresponding ridge 57 of rails 56.

The cog 66 is adapted to mate with gear 60 to impart vertical movement to the plate 64 as determined by the program in controller 90. The plate 64 includes a cutout 65 on one edge thereof. A photoeye 67 is rigidly fixed to the motor housing 54 near the edge of plate 64 to interrogate the position of the plate and to provide control signals to controller 90 regarding the position of the plate. The photoeye 67 will be blocked by the plate 64 except at the cutout portion 65 or at the top or bottom of the plate. The control signal generated by the photoeye 67 at the top and bottom of the plate 64 is used by the controller to establish top and bottom limits for vertical travel of the plate. The control signal generated by the photoeye 67 at the cutout portion 65 is used by the controller to define an intermediate position, for example, a position above an open CD door 26.

A picker support frame 68 is rigidly affixed to plate 64 and is preferably formed from sheet metal to provide a generally rectangular structure. A movable picker arm 70 is mounted on a shaft 72 extending between walls 68L and 68R of frame 68. The picker arm 70 includes member 17a rigidly mounted on the end of the picker arm and biased inwardly (toward the other members) by a spring coupled between the end of the picker arm and the frame 68.

A solenoid 82 is rigidly mounted to plate 64 with an actuator 83 extending upward from the solenoid. A spring 84 is rigidly coupled between the actuator 83 and the other end of picker arm 70.

The solenoid 82 is electrically coupled for control by controller 90 such that actuator 83 is extended toward the picker arm 70 in a resting mode and pulled into the solenoid in a picking mode. Thus, in a picking mode, the actuator 83 pulls the spring 84 and causes the picker arm 70 to rotate about shaft 72 in a counterclockwise rotation (as shown). Thus, arms 17b and 17c bear on the edge of the CD hub and arm 17a is brought to bear on the hub edge opposing arms 17b and 17c, thereby picking up the CD.

If the actuator 83 is pulled too far into the housing of solenoid 82, the disc hopper 40 is empty and the arm 17a is not bearing against anything. A photoeye 85 is positioned adjacent the actuator 83 to detect this condition and provide this control input to the controller. For example, the photoeye 85 will be blocked by the actuator 83 for normal operation but will be unblocked when the actuator is pulled too far.

Figure 12:
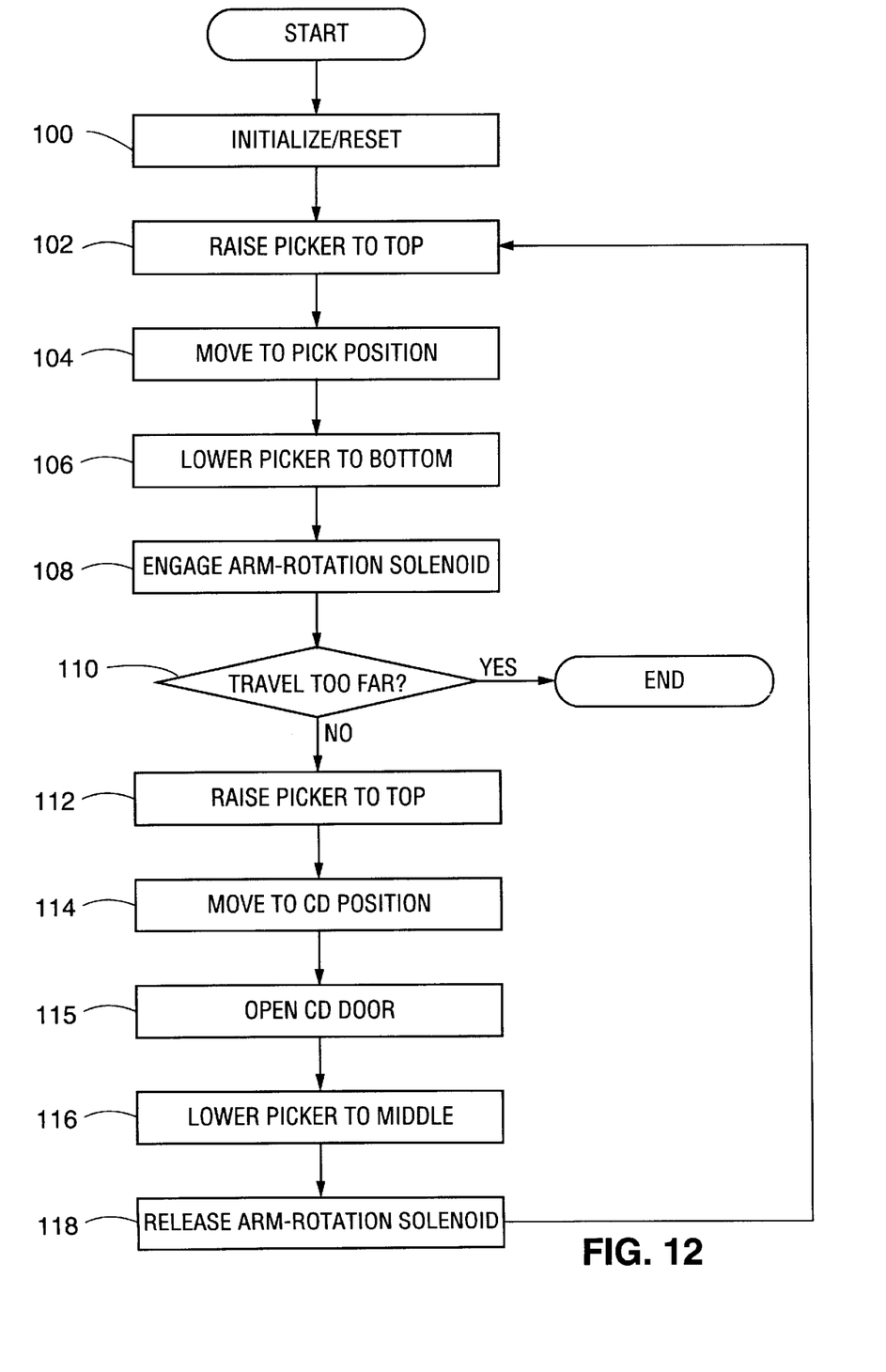
FIG. 12 is a flow chart illustrating the operation of disc handling unit.

The operation of the modular disc handling unit will now be described with reference to the flow chart shown in FIG. 12. The steps enumerated in FIG. 12 may be programmed into a microprocessorbased controller 90 using well known programming techniques.

In step 100, program constants and variables are reset and/or initialized to appropriate values.

In step 102, the picker assembly 50 is raised to the top position, i.e., wherein photoeye 66 detects the bottom of plate 64.

In step 104, the motor housing 54 is moved along the top face 22t to the desired position. In this case, the first desired position is adjacent to the disc hopper 40, which is termed the pick position. This is determined by having the photoeye 55 detect cutout 31 in index rail 28. As a practical matter, at the start of a routine the motor housing 54 will be driven to one end of the index rail 28, where, for example, cutout 29 is detected by the photoeye 55. Then, the motor housing 54 is driven along the index rail 28 until the first cutout 31, which corresponds to the disc hopper or pick position, is detected by photoeye 55.

In step 106, the picker assembly 50 is lowered to the bottom position, i.e., wherein photoeye 66 detects the top of plate 64.

In step 108, the solenoid 82 is engaged, thereby causing the rotation of picker arm 70 on shaft 72 to move member 17a away from members 17b and 17c in order to fully engage the hub at three points defining an equilateral triangle and thereby pick the top disc in the stack (if there is one).

In step 110, the solenoid photoeye 85 is checked to make sure it is in the proper state, i.e., blocked. If not, the disc hopper is empty and the routine terminates until that condition is remedied. If so, then continue to step 112.

In step 112, the picker assembly is again raised to the top position, i.e., wherein photoeye 66 detects the bottom of plate 64.

In step 114, the motor housing 54 is moved along the top face 22t to the another desired position, for example, adjacent the first of the CDR units 24. This is determined by having the photoeye 55 detect cutout 32 in index rail 28.

In step 115, the door 26 of the CDR unit 24 is opened.

In step 116, the picker assembly 50 is lowered to the middle position, i.e., wherein photoeye 66 detects the cutout 65 in plate 64.

In step 118, the solenoid 82 is released, thereby causing the rotation of the picker arm 70 on shaft 72 oppositely to that in step 108, such that arm 17a is moved inward toward arms 17b and 17c, thereby releasing the disc. The disc then drops gently into the open CDR door 26, and the routine returns to step 102 to get another disc.

It should be noted that this routine is run iteratively, and that additional positions may be defined, for example by cutout 33, or, if additional modules are interconnected, by other appropriate cutouts. Steps 114 through 118 are thereby exemplary and may be repeated for different positions by modifying the program accordingly.

It should be understood that the invention is not intended to be limited by the specifics of the above-described embodiment, but rather defined by the accompanying claims.

I claim:

1. An apparatus for picking up a compact disc from a stack of compact discs having a hub defining a center hole, wherein the compact disc is horizontally oriented, comprising:

a support frame, a plurality of members each vertically disposed and having a proximate end coupled to the support frame and a distal end extending downwardly from the support frame, said members having a smooth gripping surface and being spaced apart from each other sufficiently to contact different points on a hub of a top disc in the stack, wherein a first of said members has its distal end angled inwardly toward the center hole, means for biasing the distal end of the first member inwardly away from contacting the hub, means for moving the distal end of the first member outwardly against the biasing means for contacting the hub at the smooth gripping surface, and means for controlling relative movement between the support frame and the stack.

2. The apparatus of claim 1, wherein a second member and a third member are disposed in opposition to the first member to form a triangular section.

3. The apparatus of claim 1, wherein the first member is angled inwardly relative to the other members sufficiently to contact the hub of the top disc in the stack but not the hubs of the other discs in the stack.

4. The apparatus of claim 1, wherein the first member deforms resiliently when contacting the hub of the top disc.

5. An apparatus for separating a single compact disc from a stack of compact discs, wherein each disc has a hub defining a center hole and wherein the center holes in the stack define a central bore having a longitudinal axis, the apparatus comprising:

a support base to support the stack;

a disc pick assembly comprising a plurality of members, the members being insertable into the central bore and wherein at least one of the members is movable to a position such that the member is at an angle to the longitudinal axis and the other members are held in contact with the hub of the discs;

means for moving the members into a position to separate the top disc from the stack when at least two members contact a hub of the top disc in the stack by moving the movable member such that it is biased at an angle to the longitudinal axis and contacts only the hub of the top disc in the stack; and means for controlling relative movement between the disc pick assembly and the support base along the longitudinal axis.

6. A method for picking a single compact disc from a vertical stack of compact discs, wherein each compact disc has a hub defining a center hole such that the center holes in a stack of compact discs define a central cylindrical bore, comprising:

providing a picker module having at least two members having a smooth gripping surface and being vertically disposed in opposition to each other, controlling relative movement between the picker module and the stack such that the two members are inserted into the central cylindrical bore and one of said members contacts the hub of a top disc in the stack at the smooth gripping surface, moving the other of said members away from the one of said members such that the hub of the top disc in the stack is engaged and held on opposite sides by respective members, and controlling relative movement between the picker module and the stack such that the two members are removed from the cylindrical bore with the engaged disc remaining engaged thereon.

7. The method of claim 6, further comprising:

moving the picker module having the engaged disc to a disc handling position, and moving the other of said members toward the one of said members such that the hub of the top disc in the stack is released from engagement and dropped.

8. A method for picking up a single flat substrate from a vertical stack of such substrates, each of the substrates having a gripping edge symmetrically disposed in a known position on the substrate, comprising:

providing a plurality of members vertically disposed in opposition to each other, positioning the members such that all but one member contact the gripping edge, the members extending beyond a top substrate in the stack, and moving the one member to contact the gripping edge such that only the top substrate in the stack is engaged and held by respective members.

9. The method of claim 8, wherein the one member is angled to contact the gripping edge of only the top substrate.

10. The method of claim 8, wherein the one member is resiliently deformed when contacting the gripping edge of the top substrate.

11. An apparatus for separating a single compact disc from a stack of compact discs, wherein each disc has a hub defining a center hole and wherein the center holes in the stack define a central bore having a longitudinal axis, the apparatus comprising:

a support base to support the stack;

a disc pick assembly comprising a plurality of members, the members being insertable into the central bore;

means for moving the members into a gripping position to grip a top disc of the stack solely by exerting a radial force on the hub of the top disc, the members being resiliently deformable when contacting the hub and the members being extended into the bore beyond the top disc; and means for controlling relative movement between the disc pick assembly and the support base along the longitudinal axis.

12. The apparatus of claim 11 wherein the members in the gripping position grip the top disc when one member is angled inwardly relative to the other members to contact the hub of the top disc only.

13. An apparatus for separating a single compact disc from a stack of compact discs, wherein each disc has a hub defining a center hole and wherein the center holes in the stack define a central bore having a longitudinal axis, the apparatus comprising:

a support base to support the stack;

at least two members insertable into the central bore beyond a top disc in the stack and movable between an engaged position and a release position, the engaged position being such that the members exert solely a radial force on the hub of the top disc in the stack and the release position being such that the members do not exert a radial force on the hub of the top disc;

means for moving the members between the engaged position and the release position; and means for controlling relative movement between the members and the support base along the longitudinal axis.

14. The apparatus according to claim 13 wherein the members exert a radial force on the hub of the top disc when one member is angled such that it contacts only the top disc in the stack and exerts a radial force on the hub of the top disc.

15. An apparatus for picking a single disc from a disc stack comprising a plurality of the discs, with upper discs on the stack being directly supported by lower discs on the stack, said apparatus including:

a disc support for supporting the disc stack;

a disc pick assembly movable between an engaging state and a release state, with the assembly including three disc engaging surfaces;

a drive mechanism for controlling relative movement between the disc support and the disc pick assembly, with the drive mechanism operating to drive the disc pick assembly into a central bore formed by the disc stack when the disc pick assembly is in the release state and to move the disc pick assembly away from the central bore when the disc pick assembly is in the engaging state; and an actuator for causing the disc pick assembly to change from the release state to the engaging state when the disc pick assembly is within the bore so that all of the three engaging surfaces engage only an upper one of the discs in the stack so that only the upper one disc is separated from the stack.

16. An apparatus for picking a single disc from a disc stack comprising a plurality of the discs, said apparatus including:

a disc support for supporting the disc stack, with the disc stack defining a central bore having a major axis;

a disc pick assembly movable between an engaging state and a release state, with the assembly including three disc engaging members with at least one of the members being disposed at a first angle relative to the major axis when the disc pick assembly is in the engaging state and at a second angle, different from the first angle, when the disc pick assembly is in the release state;

a drive mechanism for controlling relative movement between the disc support and the disc pick assembly, with the drive mechanism operating to drive the disc pick assembly into the stack bore when the disc pick assembly is in the release state and to move the disc pick assembly away from the central bore when the disc pick assembly is in the engaging state; and an actuator for causing the disc pick assembly to change from the release state to the engaging state when the disc pick assembly is within the bore, with the first angle being such that only the upper one disc is contacted by the three disc members so that only the upper disc is be separated from the stack.

* * * * *